United States Patent
Scarfutti et al.

(10) Patent No.: US 12,050,564 B2
(45) Date of Patent: Jul. 30, 2024

(54) DATA REPORTING ARCHITECTURE FOR APPLICATIONS

(71) Applicant: The Toronto-Dominion Bank, Toronto (CA)

(72) Inventors: Joseph Vincent Scarfutti, Brooklyn, NY (US); Aneesha Suresh Bulchandani, Hoboken, NJ (US)

(73) Assignee: The Toronto-Dominion Bank

( * ) Notice: Subject to any disclaimer, the term of this patent is extended or adjusted under 35 U.S.C. 154(b) by 218 days.

(21) Appl. No.: 17/060,523

(22) Filed: Oct. 1, 2020

(65) Prior Publication Data
US 2022/0107924 A1 Apr. 7, 2022

(51) Int. Cl.
G06F 16/21 (2019.01)
G06F 16/242 (2019.01)
G06F 16/25 (2019.01)

(52) U.S. Cl.
CPC ........ G06F 16/213 (2019.01); G06F 16/2423 (2019.01); G06F 16/2448 (2019.01); G06F 16/25 (2019.01)

(58) Field of Classification Search
CPC .... G06F 16/213; G06F 16/2448; G06F 16/25; G06F 16/2423
See application file for complete search history.

(56) References Cited

U.S. PATENT DOCUMENTS

| | | | |
|---|---|---|---|
| 5,790,137 A | 8/1998 | Derby | |
| 7,376,654 B1 | 5/2008 | Chau et al. | |
| 8,336,056 B1 | 12/2012 | Gadir | |
| 11,018,959 B1 | 5/2021 | Neill | |
| 11,055,113 B1 | 7/2021 | Scarfutti et al. | |
| 2009/0150412 A1* | 6/2009 | Idicula | G06F 16/24542 |
| 2013/0086104 A1* | 4/2013 | Morrison | G06F 16/211 |
| | | | 707/769 |
| 2014/0143648 A1 | 5/2014 | Kolesnikov | |
| 2014/0380282 A1 | 12/2014 | Ravindranath Sivalingam et al. | |

(Continued)

OTHER PUBLICATIONS

Bidelman, "The Basics of Web Workers" The Workers, Jul. 2010, 12 pages.

(Continued)

*Primary Examiner* — Dinku W Gebresenbet
*Assistant Examiner* — Dustin D Eyers
(74) *Attorney, Agent, or Firm* — Fish & Richardson P.C.

(57) ABSTRACT

One example method includes receiving a first request from a first application for data corresponding to a first schema, the first request including information specifying the first schema. A first data type mapping to the first schema is determined using a schema definition from a data dictionary. Data of the first data type is obtained from first data source(s), and forwarded to the first application. A second request is received from a second application for data of a second data type, the second request including information specifying the second data type. It is determined that a schema definition for the second data type is unknown. A new schema definition for the second data type is generated to include a second schema mapping to the second data type. Data of the second data type is obtained from second data source(s), and forwarded to the second application, along with the second schema.

20 Claims, 3 Drawing Sheets

(56) References Cited

U.S. PATENT DOCUMENTS

| | | | | |
|---|---|---|---|---|
| 2016/0078103 | A1* | 3/2016 | Novik | G06F 16/2477 707/725 |
| 2016/0117123 | A1* | 4/2016 | Matsuo | G06F 3/0659 711/105 |
| 2016/0269286 | A1* | 9/2016 | Zhou | H04L 67/142 |
| 2017/0063826 | A1 | 3/2017 | Sundaresan et al. | |
| 2017/0330143 | A1* | 11/2017 | Raghavan | G06F 40/174 |
| 2018/0089262 | A1* | 3/2018 | Bhattacharjee | G06F 16/24535 |
| 2020/0004730 | A1* | 1/2020 | Brown | G06F 16/248 |
| 2020/0195705 | A1 | 6/2020 | Liu | |
| 2021/0294620 | A1 | 9/2021 | Scarfutti et al. | |

OTHER PUBLICATIONS

Khamball, "Building an Async React Renderer with Diffing in Web Worker" learnings from tinkering around with React Reconciler, Sep. 2018, 32 pages.

Sundell, "A first look at the new diffable data sources for table views and collection views" Daily Coverage of Apple's WWOC 2019 Conference, Dec. 2019, 7 pages.

Zhang, "Medical data visual synchronization and information interaction using Internet-based graphics rendering and message-oriented streaming" Informatics in Medicine Unlocked, Oct. 2019, 14 pages.

Non-Final Office Action in U.S. Appl. No. 17/340,392, dated May 11, 2023, 17 pages.

Non-Final Office Action in U.S. Appl. No. 17/340,392, dated Feb. 3, 2022, 15 pages.

Final Office Action in U.S. Appl. No. 17/340,392, dated Aug. 16, 2022, 19 pages.

Office Action in Canada Appln. No. 3,073,723, dated Nov. 1, 2022, 4 pages.

Office Action in Canada Appln. No. 3,073,723, mailed on Sep. 5, 2023, 5 pages.

* cited by examiner

DATA REPORTING ARCHITECTURE FOR APPLICATIONS

TECHNICAL FIELD

The present disclosure relates to computer-implemented methods, software, and systems to collect and report data for applications presented on a user interface displayed on a device.

BACKGROUND

Organizations dealing with large volumes of data often use application platforms to process the data for decision making purposes. In some cases, such an application platform renders, on a user interface (UI) displayed on a computing device, a large volume of data, for example, in the order of millions of data records, some or all of which can be obtained from different sources.

SUMMARY

The present disclosure involves systems, software, and computer-implemented methods related to an application programming interface (API) architecture that can collect and report large volumes of data of different types, or for different application platforms, or both. The API architecture, which is realized using processes run on one or more back-end servers that are connected with front-end client devices running the application platforms, is self-adjusting and uses dynamic data schema, to adjust during runtime to changes in data structures. The API architecture supports both streaming data and batch processing, and handles bi-temporal data, enabling the end user to simultaneously view different time-based snapshots of the data. In some implementations, the application platforms include a financial trading platform; in such implementations, the API architecture collects and reports large volumes of trading data, for example, risk and/or profit-loss data, to the financial trading platform.

One example method for collecting and reporting data using one or more server processes includes receiving a first request from a first client application for data corresponding to a first schema, the first request including information specifying the first schema; in response to receiving the first request, processing the first request, wherein processing the first request comprises: determining, using a schema definition stored in a data dictionary, a first data type that maps to the first schema included in the first request; obtaining, from one or more first data sources, first data corresponding to the first data type; forwarding, to the first client application, the first data; receiving a second request from a second client application for data of a second data type, the second request including information specifying the second data type; in response to receiving the second request, processing the second request, wherein processing the second request comprises: determining that a schema definition corresponding to the second data type is unknown; in response to the determination, generating a new schema definition for the second data type, the new schema definition including a second schema that maps to the second data type, and updating the data dictionary to include the new schema definition; obtaining, from one or more second data sources, second data corresponding to the second data type; and forwarding, to the second client application, (i) the second data and (ii) the second schema.

Implementations can optionally include one or more of the following features. In some implementations, obtaining the first data corresponding to the first data type further comprises: determining a third data type that is associated with the first data; obtaining, from one or more third data sources, third data corresponding to the third data type; and forwarding, to the first client application, the third data in conjunction with the first data in response to the first request. In some implementations, forwarding the third data in conjunction with the first data in response to the first request comprises: processing at least one of the first data or the third data to enable display, by the first client application, of the first data and the third data together.

In some implementations, obtaining the first data from the one or more first data sources and obtaining the second data from the one or more second data sources comprises: obtaining the first data from one or more first databases that are configured to store data of the first data type; and obtaining the second data from one or more second databases that are configured to store data of the second data type, wherein the second data type is different from the first data type.

In some implementations, the second request is received while obtaining the first data from the one or more first data sources, and the method comprises: processing the second request while waiting to receive the first data from the one or more first data sources.

In some implementations, the first data type comprises real-time streaming data, and wherein obtaining the first data from the one or more first data sources comprises: in response to receiving the first request, subscribing to the one or more first data sources; and upon the subscribing, receiving, from the one or more first data sources, real-time streaming data as the first data.

In some implementations, the first data type comprises batch data, and wherein obtaining the first data from the one or more first data sources comprises: in response to receiving the first request, subscribing to the one or more first data sources; and upon the subscribing, fetching, from the one or more first data sources, pre-configured batch data as the first data using chunked data transfer.

In some implementations, receiving the first request from the first client application for data comprises: receiving, from the first client application, one or more keywords entered by a user of the first client application; and generating, using a query generator, the first request from the one or more keywords.

In some implementations, the method further comprises: receiving a third request to access the data dictionary; and in response to the third request, enabling access to the data dictionary using a graphical schema visualization tool.

In some implementations, forwarding at least one of the first data or the second data comprises forwarding bi-temporal data.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Organizations often deal with large volumes of data that are consumed by organizational users using data-driven application platforms. For example, employees in an investment bank dealing with equities and derivatives view trading data using trading application platforms on a regular basis to make buy and sell decisions. Such a trading application platform relies on a client-server system architecture, executing processes on one or more user (client) devices and one or more servers, and facilitating exchange of trading data (e.g. risk and/or profit-loss data) between the components of the system. The trading application platform renders, on user interfaces displayed on one or more client devices, large volumes of trading data, for example, in the order of millions of data records. The data can be bi-temporal in nature, and can be streamed in real-time from one or more back-end servers, or batch processed in the server(s) before transmitting to the front-end client devices. As another example, a survey organization can use a statistical analysis platform to process large volumes of polling data, in a manner similar to the above. In some cases, the client devices run different application platforms on different types of devices (for example, desktop web browser or smartphone applications), or consume different types of data coming from disparate sources.

It can be challenging to build a back-end application programming interface (API) architecture that involves one or more coordinated processes running on one or more back-end servers, collecting and reporting different types of data, or providing runtime support for changes in data types. The back-end servers handle large volumes of data, which originate from various sources and can be of different data types. The servers use APIs to obtain the data from various sources, process the data per user demand, and provide the data to the front-end. The end user demands for types of data, or specific processing (for example, batch or streaming) can change during runtime. Conventional systems may not be able to handle different types of data, or may require downtime to make incremental changes to the API source code to process new data types.

The following sections describe the disclosed systems, software, and computer-implemented methods with respect to a trading application platform, without loss of generality. However, the disclosed systems, software, and computer-implemented methods are also applicable to other types of application platforms.

In particular, the present disclosure describes various techniques related to a trading platform that addresses the issues faced by the traditional approaches, outlined above. The disclosed techniques realize an API architecture involving one or more servers, which can process large volumes of data of different types, or for different application platforms, or both. To serve user requests from front-end client devices, the API architecture obtains data (which can be of same or types) from various data sources, processes the data, and reports the data to the front-end client devices. The data is further processed by the front-end client devices for presentation to the end users, including, for example, those described in greater detail in co-pending application U.S. Ser. No. 16/801,418, and titled "Data Rendering for Applications," which is incorporated herein by reference in its entirety.

As described in greater detail below, in some implementations, the API architecture is self-adjusting and uses dynamic data schema, to adjust during runtime to changes in data types, without requiring code changes to the underlying software routines. In this context, a data schema (also referred to as "schema") is a logical data type abstraction (which is, for example, presented to the front-end user) that maps to an actual data type of data stored by data sources in the back-end. front-end. Different data schemas map to different data types, with are stored as individual schema definitions in a data dictionary. The API architecture uses a declarative-type system for a schema definition, which is exposed to the front-end client devices, for example, using an introspection API that allows a front-end user to view a list of the variables and operations available for the schema definition model. Using the declarative type system enables the architecture to service different front-end clients that use data of different data types. Using dynamic data schema, which facilitates the generation of new schema definitions during runtime, the API architecture can add new (for example, previously unknown to, or unused in, the architecture) data types during runtime.

In some implementations, the API architecture performs data "joins," for example, similar to the "join" capabilities offered by relational databases. In some implementations, while servicing a front-end request for data of a specific data type, the API architecture queries other data sources for related data types, and reports the data corresponding to the related data types along with data of the requested data type. Accordingly, a single query from a client device can be used to request for "joined" data, as opposed to several round-trips to the back-end server(s).

In some implementations, the API architecture supports both streaming data (unbounded data) and batch data sets (bounded data). The architecture provides native support for subscription to real-time data updates, and handles batch processing as a special case of the streaming use case. In some implementations, for batch processing, the API architecture provides a REpresentational State Transfer (REST)-based API (referred to as a "RESTful API") to fetch pre-configured reports produced by batch processes. The RESTful API enables implementing the API architecture using existing protocols. For example, in some of those instances, the RESTful API can be built as a layer on top of a GraphQL API by leveraging chunked data transfer. The underlying GraphQL query language runtime processes translates the user requests to database-specific queries to enable fulfilling those queries with existing data types.

In some implementations, the API architecture handles streaming data and batch processing from different front-end client devices using both synchronous (for example, real-time) and asynchronous (for example, non real-time) streams. The architecture processes asynchronous streams with non-blocking backpressure, following a reactive streams paradigm. This allows handling streams of data—especially real-time live data whose volume is not predetermined—in an asynchronous system in a controlled manner to manage resource consumption by the server processes, or the front-end applications, or both, such that a fast data-streaming source does not overwhelm the server or front-end client device resources. This approach provides resilience by ensuring that all data consumers in a stream-based system participate in flow control to ensure steady state of operation and graceful degradation.

In some implementations, the API architecture handles bi-temporal data, enabling end users to view different concurrent time-based snapshots of the data. In this context, bi-temporal data refers to data that is modeled using bi-temporal modeling, which handles historical data along two different timelines. This makes it possible to rewind the information to "as it actually was" at the time of generation, in combination with "as it was recorded" at some point in time. This is useful, for example, in financial reporting, to be able to recreate an old report both as it actually looked at the time of creation and as it should have looked given corrections made to the data after its creation. In doing so, the API architecture facilitates the creation of complete audit trails of data.

The disclosed techniques enable back-end server processes for a trading application platform to collect and report data of different types, some of which may be obtained from different data sources, for display on front-end client devices. In doing so, the back-end server processes realize an all-encompassing API architecture, which is database-agnostic and can connect to any available data source. The API architecture can service different types of front-end client devices using a declarative type system, which avoids over-fetch problems that can be experienced using conventional architectures (for example, RESTful APIs). The use of dynamic schema evolution with no code generation allows the API architecture to auto-adjust to changes made to the underlying schema definitions. The API architecture is resilient to a large number of requests from different client devices due to the use of asynchronous stream processing with non-blocking backpressure.

The disclosed API architecture is in contrast to conventional API architectures, which are, in general, built iteratively and require consensus from all stakeholders in the event an API needs to diverge from its agreed-upon (initial) contract. For such conventional architectures, handling of new data types can cause substantial downtime to rework the architecture and related code.

The disclosed techniques accordingly allow the trading platform to service complex business problems for distinct front-end client devices on multiple platforms (for example, desktop web browser, mobile devices, among others), facilitating interaction with data that is spread across several different data sources. In doing so, the trading platform remains promptly responsive to user inputs, which can facilitate accurate and/or effective decision making by the users of the data.

Figure 1:
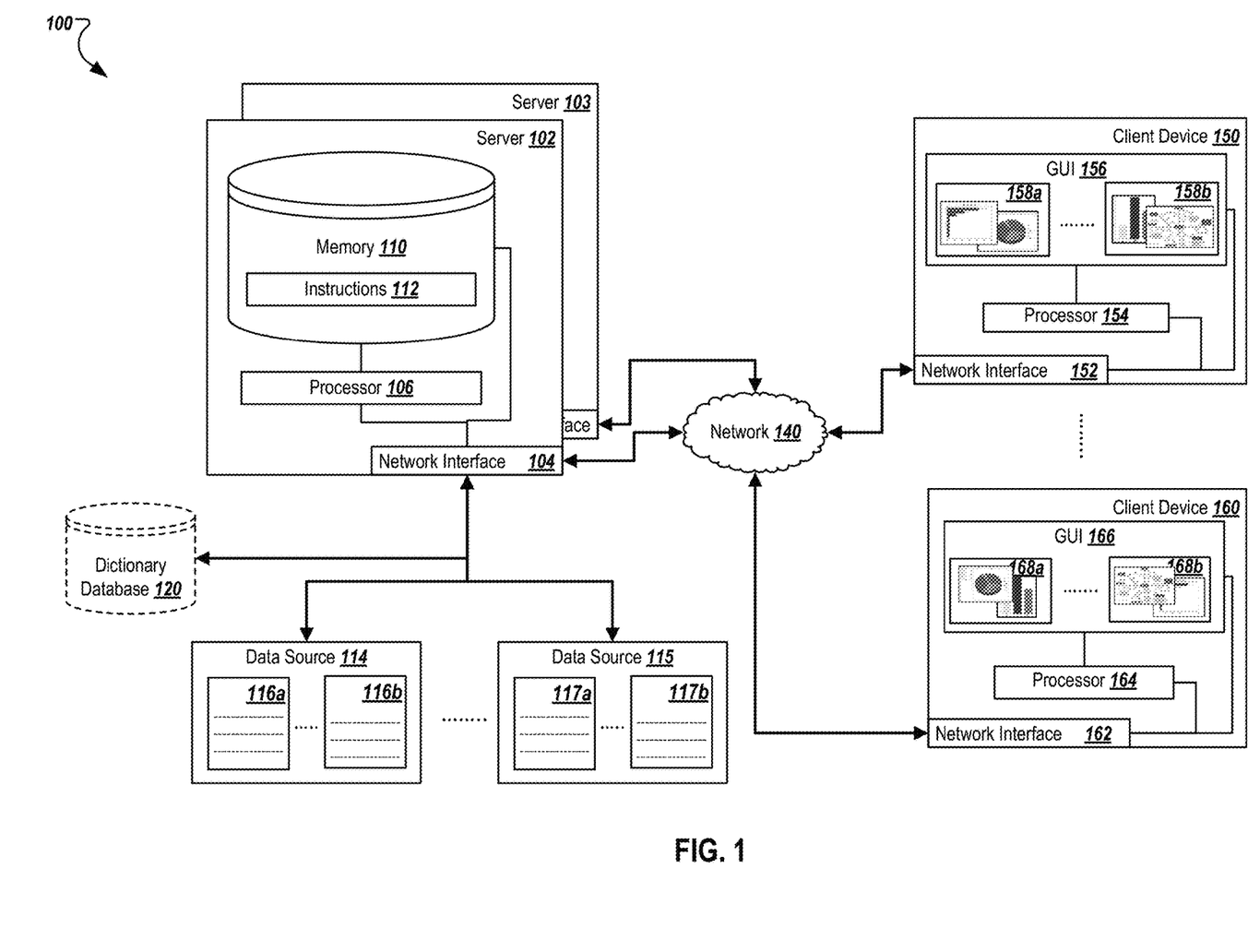
FIG. 1 shows a block diagram of an example system that uses an API architecture to collect and report data for applications presented on a user interface displayed on a client device.

Turning to the illustrated example implementation, FIG. 1 shows a block diagram of an example system 100 that uses an API architecture to collect and report data for applications presented on a user interface displayed on a client device. As shown in FIG. 1, the system 100 includes servers 102 and 103, client devices 150 and 160 that are communicably coupled to the servers through a network 140, and data sources 114 and 115 that are communicably coupled to the servers 102 and 103. Optionally, in some implementations, the system 100 includes a dictionary database 120.

Although FIG. 1 illustrates two servers 102 and 103, the system 100 can be implemented using a single server (for example, one of server 102 or server 103), or more than the two servers that are shown. Similarly, although FIG. 1 illustrates two client devices 150 and 160, the system 100 can be implemented using a single client device (for example, one of client device 150 or client device 160), or more than the two client devices that are shown. Further, although FIG. 1 illustrates two data sources 114 and 115, the system 100 can be implemented using a single data source (for example, one of data sources 114 or 115), or more than the two data sources that are shown.

In some implementations, the servers 102 and 103 each execute one or more processes that realize an API architecture. The processes run on server 102 can realize one or more functional units of the API architecture, while the processes run on server 103 can realize other functional units of the API architecture, with the processes in the two servers interacting with one another within and across the servers to coordinate their functionalities, for implementing the API architecture. In some implementations, the processes run on the servers 102 and 103 for the API architecture can mirror each other, such that one of the servers 102 or 103 provide redundancy to the other, for example, in case of server failures. In the following description, without loss of generality, the API architecture in the system 100 is described with reference to the server 102. It is to be understood that the server 103, or other servers in the system 100 that are used to realize the API architecture, have similar features and functionalities.

In some implementations, the server 102 and the client devices 150 and 160 are associated with (for example, owned or used by) the same organization, and collaborate to collect, process and display, using front-end UIs of application platforms running on the client devices, large volumes of data of interest to the organization. For example, in some cases, the organization is a bank or other financial institution. The server 102 obtains and stores trading data, such as risk and/or profit-loss data, from various different data providers, for example, data source 114 or data source 115, or both, and reports the data to the client devices using the API architecture. In some implementations, the client devices connect to the server through the API architecture to obtain the trading data. A trading platform running on the client device 150 and/or the client device 160 obtains the trading data from the server 102 using the APIs, and presents the data on a user interface of the trading platform displayed on the respective client device. The trading data presented can be in large volumes, for example, millions of records of data, or can be streamed in real-time from the server 102, or both.

In some implementations, the client devices 150 and 160 are associated with a first organization, while the server 102 is associated with a second organization, with the client devices 150, 160 communicating with the server 102 to consume data provided by the server 102. For example, in some cases, the first organization is a bank or other financial institution, while the second organization is another bank or financial data reporting service, from which the first organization obtains trading data. The second organization implements the API architecture on the server 102 to collect and store trading data from different data providers (for example, one or both of data sources 114 and 115), making the data available to customers of the second organization through network connections established using the API architecture provided by the server 102. The client device 150 and/or the client device 160 run a trading platform to present trading data, including trading data that obtained from the server 102. The client devices 150, 160 communicate with the server 102 using the API to obtain the trading data for presentation. The trading data presented can be in large volumes, for example, millions of records of data, or can be streamed in real-time from the server 102, or both. The client devices 150 and 160 can be used by the same user, or by different users.

In some implementations, the server 102 and one or more of the data sources 114 and 115 are associated with the same organization. For example, in some cases, the organization, such as a bank, can generate raw data (for example, trading volume, currency rates, among others), which is stored in a suitable format (for example, data type) in the data source 114 or 115. The server 102 collects and processes the data from the data source in response to requests from the client devices.

In some implementations, the server 102 is associated with a first organization, while the data sources 114 and 115 are associated with one or more other organizations, with the server 102 communicating with the data sources 114 and 115 to collect data provided by the respective data sources. The data sources 114 and 115 can be associated with the same organization, or each can be associated with a different organization. For example, in some cases, the server implements the back-end API architecture for the trading application platform for a bank, while the data sources 114 and 115 are associated with other financial institutions that provide trading data to the bank, such as a stock exchange, a commodities exchange, among others.

In general, the system 100 allows the illustrated components to share and communicate information across devices and systems (for example, server 102 and data source 114 or 115, and server 102 and client device 150 or 160, among others, through network 140). In some instances, the server 102 is a cloud-based component or system that is remotely connected to client devices, such as client devices 150 and 160, through public or private networks or a combination of the two. In some instances, the server 102 is a non-cloud-based component or system that is proximally connected to the client device 150 and/or client device 160, such as in an on-premise system configuration, a client-server application, applications running on one or more client devices, or combinations thereof. Although components are shown individually, in some implementations, functionality of two or more components, systems, or servers may be provided by a single component, system, or server.

In some implementations, the server 102 and one or more of the data sources 114 and 115 are co-located. For example, the server 102 and the co-located data source 114 or 115 can be non-cloud-based components or systems that are proximally connected, such as in an on premise system configuration (such as a bank office building), and connected through a local area network (LAN). This can be the case, for example, when the server and the co-located data source are associated with the same organization. In some implementations, the data sources 114 and 115 are cloud-based components that are remotely connected to the server 102, through public or private networks or a combination of the two. This can be the case, for example, when the server 102 and the data sources 114 and 115 are associated with the different organizations, as described above.

As used in the present disclosure, the term "computer" is intended to encompass any suitable processing device. Server 102 and/or client devices 150 and 160 can be any computer or processing device such as, for example, a blade server, general-purpose personal computer (PC), Mac®, workstation, UNIX-based workstation, or any other suitable device. Moreover, although FIG. 1 illustrates two servers 102 and 103, the system 100 can be implemented using a plurality of servers, such as a server pool, as well as computers other than servers. In other words, the present disclosure contemplates computers other than general-purpose computers, as well as computers without conventional operating systems. Similarly, the client device 150 or the client device 160, or both, can be any system that can interact with the server 102, receive inputs from users, and display information using one or more GUIs, for example, display trading data on a trading platform UI shown using a web browser on the respective client device. A client device can be a desktop computer, a laptop computer, a television with computer processing capabilities, a smart display device, or a mobile device, such as a smartphone, tablet, smartwatch, portable music player, electronic book reader, or any other suitable mobile computing device. In general, each illustrated component may be adapted to execute any suitable operating system, including Linux, UNIX, Windows, Mac OS®, Java™, Android™, Windows Phone OS, or iOS™, among others. A client device may include one or more specific applications executing on the client device, or the client device may include one or more web browsers or web applications that can interact with particular applications executing remotely from the client device, such as processes executed by the server 102.

As illustrated, the server 102 includes or is associated with a network interface 104, processor(s) 106, and memory 110. The memory 110 includes instructions 112 that are executed by the processor(s) 106 to perform various operations, which include processes or functional units corresponding to the API architecture. In some implementations, the memory 110 stores a data dictionary, which stores schema definitions for the different data types that are handled by the API architecture running on the server 102. However, in some implementations, the data dictionary is stored external to the server 102. For example, in some instances, the system 100 includes a dictionary database 120 that stores a data dictionary with the schema definitions. In such cases, the server 102 connects to the database 120 over a network connection (for example, through a LAN, or a combination of public and private networks) to access the data dictionary. In some implementations, a data dictionary with schema definitions is stored both in the memory 110, and the dictionary database 120. For example, in such cases, portions of the data dictionary can be stored in each location, or the entire data dictionary can be stored in both locations for redundancy.

The data sources 114 and 115 are database servers, or a combination of data servers. Each data source 114 and 115 store data, which in some implementations are stored as data records, such as data records 116a and 116b in data source 114, and data records 117a and 117b in data source 115. In some implementations, the data stored in data source 114 is of a different data type than the data stored in data source 115. For example, data source 114 can be a SQL server, which is a relational database management system, while data source 115 can be a MongoDB server, which is a cross-platform document-oriented database program. In such cases, the SQL server data source 114 stores SQL server data types, while the MongoDB server data source 115 stores data of a different type, as JSON-like documents with optional schemas. The data sources 114 or 115, or both, can be other types of database servers, for example, PostgreSQL, Kafka, or Pulsar, among others, that store respective data types.

In some implementations, the data records 116a and 116b, or 117a and 117b, or both data types, include financial trading data, such as prices of various securities, financial market news or events, among others. In some implementations, the data records include real-time data, for example, fluctuations in prices of securities during a trading period. In some implementations, the data records include streaming service data that are used by one or more entities associated with the system 100. For example, the data records 116 and 116b can include financial services data that are used by market traders to make financial decisions. In such implementations, the server 102 subscribes to the streaming service for the data source 114, and obtains the data records 116a and 116b. In some implementations, one or more data records 116a, 116b, 117a, and 117b, includes raw data, which corresponds to data that has not been processed for presentation a user on a client device, such as client device 150 and/or client device 160. In some implementations, all or some of the various types of data disclosed above are stored as raw data. In some implementations, all or some of the various types of data disclosed above are stored as processed data.

The network interface 104 is used by the server 102 for communicating with other systems in a distributed environment—including within the system 100—connected to the network 140, for example, the client devices 150 and 160, and other systems communicably coupled to the server 102 and/or network 140. Generally, the network interface 104 comprises logic encoded in software and/or hardware in a suitable combination and operable to communicate with the network 140 and other components. More specifically, the network interface 104 may comprise software supporting one or more communication protocols associated with communications such that the network 140 and/or interface's hardware is operable to communicate physical signals within and outside of the illustrated system 100. Still further, the network interface 104 may allow the server 102 to communicate with the client device 150 and/or client device 160, and others, to obtain and/or provide information regarding trading platforms.

The network 140 facilitates wireless or wireline communications between the components of the system 100 (for example, between the server 102 and the client devices 150 and/or 160), as well as with any other local or remote computers, such as additional client devices, servers, or other devices communicably coupled to network 140, including those not illustrated in FIG. 1. In some implementations, the server 102 connects to one or more of the data sources 114 and 115, or to the dictionary database 120, or any or all of these, through the network 140. In the illustrated environment, the network 140 is depicted as a single network, but may be comprised of more than one network without departing from the scope of this disclosure, so long as at least a portion of the network 140 can facilitate communications between senders and recipients. In some instances, one or more of the illustrated components (for example, the server 102) may be included within or deployed to network 140 or a portion thereof as one or more cloud-based services or operations. In some instances, the network 140 is all or a portion of an enterprise or secured network, while in another instance, at least a portion of the network 140 represents a connection to the Internet. In some instances, a portion of the network 140 is a virtual private network (VPN). Further, all or a portion of the network 140 can comprise either a wireline or wireless link. Example wireless links may be based on Wi-Fi technologies such as 802.11a/b/g/n/ac/ax, or cellular technologies such as 2G, 3G, WiMAX, LTE, 5G, or 6G, and/or include any other appropriate wireless link. In other words, the network 140 encompasses any internal or external network, networks, sub-network, or combination thereof operable to facilitate communications between various computing components inside and outside the system 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

Although FIG. 1 shows that the server 102 includes a single processor 106, multiple processors may be used according to particular needs, desires, or particular implementations of the system 100. Each processor 106 may be a central processing unit (CPU), an application specific integrated circuit (ASIC), a field-programmable gate array (FPGA), or another suitable component. Each processor 106 may have a single or multiple cores, with each core available to host and execute an individual processing thread. Further, the number of, types of, and particular processors 106 used to execute the operations described herein may be dynamically determined based on a number of requests, interactions, and operations associated with the server 102.

Memory 110 may represent a single memory or multiple memories. The memory 110 may include any memory or database module and may take the form of volatile or non-volatile memory including, without limitation, magnetic media, optical media, random access memory (RAM), read-only memory (ROM), removable media, or any other suitable local or remote memory component. The memory 110 stores various objects or data, including instructions 112, data, and any other appropriate information associated with the server 102, including any parameters, variables, algorithms, instructions, rules, constraints, or references thereto. Additionally, the memory 110 may store any other appropriate data, such as VPN applications, firmware logs and policies, firewall policies, a security or access log, print or other reporting files, as well as others. While illustrated within the server 102, memory 110 or any portion thereof, including some or all of the particular illustrated components, may be located remote from the server 102 in some instances, including as a cloud application or repository, or as a separate cloud application or repository when the server 102 itself is a cloud-based system. In some instances, some or all of memory 110 may be located in, associated with, or available through one or more other systems of the associated organization.

The server 102 includes, among other components, several applications, entities, programs, agents, or other software or similar components capable of performing the operations described herein. Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. Each software component may be fully or partially written or described in any appropriate computer language including C, C++, JavaScript, Java™, Visual Basic, assembler, Python, Perl®, XML, any suitable version of 4GL, among others.

One or more client devices 150 and 160 are present in the system 100. Client devices 150 and 160 each includes, among other components, a network interface (respectively, network interfaces 152 and 162) for communication (similar to or different from network interface 104), at least one processor (respectively, processors 154 and 164) (similar to or different from processor 106), and a display that presents a graphical user interface (GUI) (respectively, GUIs 156 and 166). In some instances, each client device 150 and 160 includes an input device, such as a keypad, touch screen, or other input/output mechanisms that enable user interaction with one or more client applications, such as a trading platform front-end user interface displayed on the GUI 156 or GUI 166.

In some implementations, the client devices 150 and 160 each executes a front-end trading application platform, for example, by executing, using the processor 154 and 164 respectively, instructions corresponding to the trading platform, to present data to user(s) of the client device. The data for the trading platform is presented using a GUI 156 on client device 150, and using a GUI 166 on client device 160, as shown. In some implementations, the data is presented using one or more panels in the GUI 156, such as panels 158a and/or 158b. Each of the panels 158a and 158b can present trading data that has been processed for display on the GUI 156. Similarly, the data is presented using one or more panels in the GUI 166, such as panels 168a and/or 168b. Some or all of the trading data shown in the various panels can be same or different. Even if the underlying trading data is the same, the format in which the data is presented can be different among panels.

In some implementations, the data presented on the client device 150 is of a different data type (for example, SQL server data type) than the data presented on the client device 160 (for example, MongoDB data type). In either case, for each of the client devices 150 and 160, the server 102 uses the API architecture to collect the data from the respective data sources (for example, one or more of data sources 114 and 115), and provide the data to the client devices, either upon receiving specific requests from respective client devices, or for a streaming subscription. The operations performed by the API architecture on the server 102 to collect and provide data to the client devices are described in greater detail below.

The front-end trading application platform running on client device 150 or 160 sends requests to the API architecture running on the server 102 for data to be displayed on the respective GUI. The requests can be for subscription to a streaming data source to receive streaming data (for example, continuous stock market updates), or to receive batch data (for example, a data analysis for a specific time period). In some implementations, a request specifies a logical schema for the requested data type. This can be the case, for example, when the request is for an actual raw data type known to the API architecture, the data type having been mapped to a logical schema and stored as a schema definition entry in the data dictionary used by the API architecture. Upon receiving the request, the API architecture looks up the actual data type mapped to the requested schema by accessing the schema definition in the data dictionary. In some implementations, in addition to the mapping of a logical schema to an actual data type, a schema definition also includes information identifying one or more data sources that store the corresponding data. In such instances, the API architecture also determines the target data sources from the schema definition. In some implementations, one or more target data sources are identified using information included in a request. In either case, in some implementations, with knowledge of the actual data type, the API architecture determines and the corresponding data source(s) (for example, data source 114 or 115), the API architecture obtains the data from the data source(s), and forwards the data to the client device. In some implementations, a request further specifies one or more other parameters related to the requested data, for example, a time period for which data is to be reported, specific data sources that are to be included or excluded for the data collection, or other suitable parameters. In such implementations, with knowledge of the actual data type and the corresponding data source(s), the API architecture obtains data that meet the constraints specified by the additional parameters, and forwards the data to the client device.

In some implementations, a request specifies an actual data type. This can be the case, for example, when the request is for a new data type that is not known to the API architecture. Upon receiving the request, the API architecture determines that the requested data type is this is an unknown data type since a corresponding schema definition is unavailable in the data dictionary. The API architecture dynamically generates a schema definition with a new logical schema mapped to the new data type, and stores the schema definition in the data dictionary. The API architecture also queries one or more data sources (for example, data sources 114 and 115) to determine which data source stores data of the requested data type. When a data source responds, the API architecture records the identity of the data source along with the schema definition. The API architecture obtains then the data from the identified data source, and forwards the data to the client device, along with the new logical schema.

In some implementations, upon determining an actual data type for a request and the corresponding data source, the API architecture also queries for related data from other data sources. Upon locating related data, the API architecture obtains the related data from respective data sources, and sends the related data to the front-end client device, along with the requested data. For example, the request data may be for stock trading data, and the API architecture determines, using the schema definitions from the data dictionary, that the stock trading data is available as SQL server data type, with the data stored in from data source 114 (which is a SQL server in this example). In addition to obtaining the requested stock trading data from the data source 114, the API architecture can also query the other data sources for stock trading-related data (for example, analysis of the stock trading data, historical margins, among others) stored as SQL server data type. Upon determining that another data source stores SQL server data type stock trading-related data, the API architecture obtains the related data from the other data source, and sends the requested stock trading data and the related data to the requesting client device. In this manner, the API architecture running on the server 102 provides services similar to "join" capabilities offered by relational databases, allowing a single query to be used to request for "joined" data, as opposed to several round-trips to the server.

Figure 2:
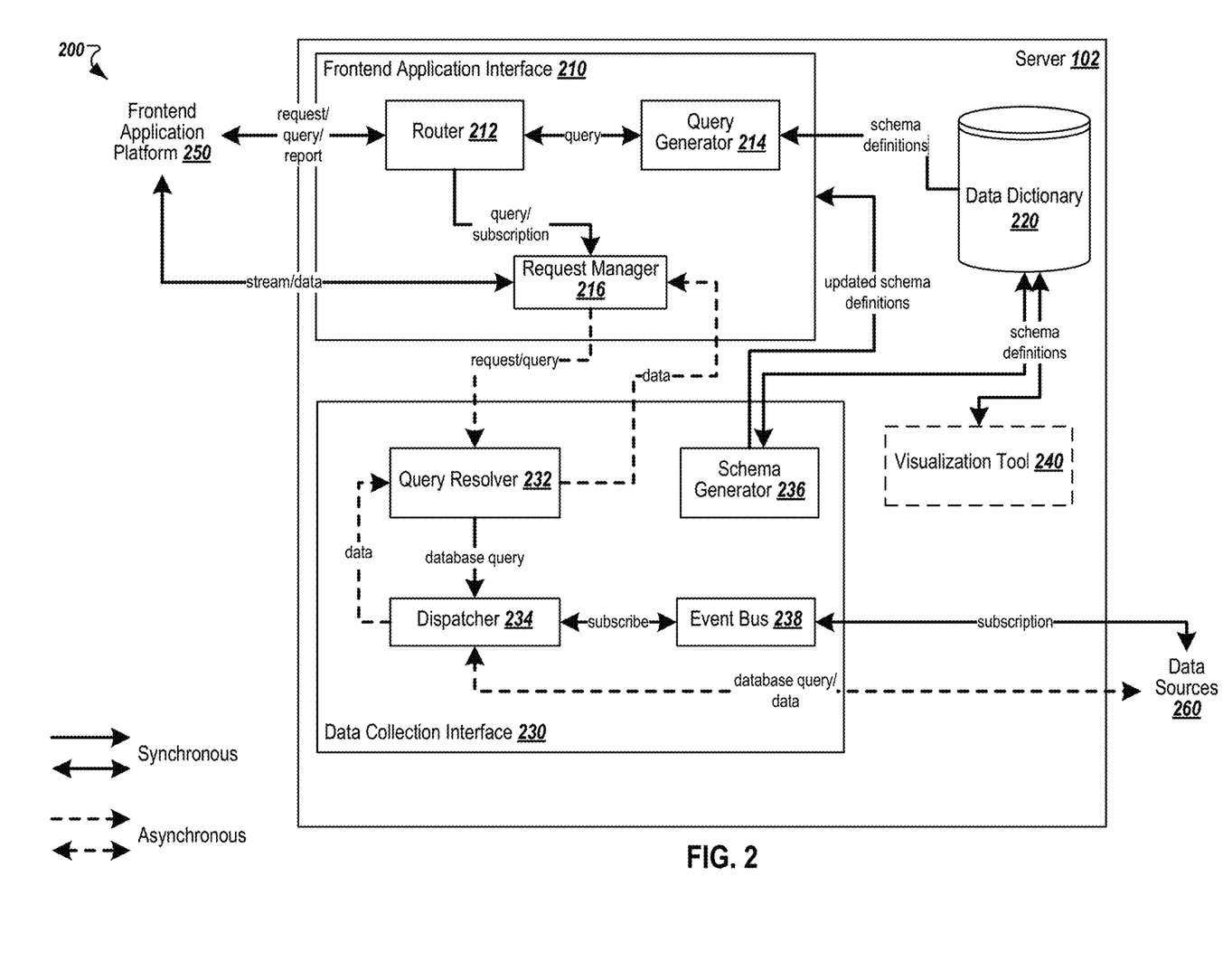
FIG. 2 shows a detailed view of the functional components of an API architecture used to collect and report data for applications presented on a user interface displayed on a client device.

FIG. 2 shows a detailed view of the functional components of an API architecture 200 used to collect and report data for applications presented on a user interface displayed on a client device. For clarity of presentation, the API architecture 200 is shown as implemented in the server 102 of the system 100 illustrated in FIG. 1. Accordingly, the description that follows describes the API architecture 200 in the context of the system 100. However, it will be understood that API architecture 200 may be implemented, for example, in any other suitable system, environment, software, and hardware, or a combination of systems, environments, software, and hardware as appropriate. Further, although only one server is shown implementing the API architecture 200, other implementations can have a plurality of servers implementing the API architecture 200.

As described previously, the API architecture 200 is implemented using one or more software processes running on the server 102, which are realized upon the processor 106 executing instructions (for example, instructions 112) stored in the memory 110. The software processes form functional components that interact with one another, and with the front-end application platform running on client devices and the data sources, to implement the API architecture 200. While the implementation of the API architecture 200 illustrated in FIG. 2 shows various individual functional components that implement the features and functionality of the API architecture through various objects, methods, or other processes, in some implementations, the API architecture 200 can instead include a different number or types, or both, of functional components, sub-modules, third-party services, components, libraries, and such, as appropriate. Conversely, the features and functionality of various components can be combined into single components as appropriate.

Turning to FIG. 2, in some implementations, the functional components of the API architecture are grouped into a front-end application interface 210 and a data collection interface 230. Optionally, in some implementations, the API architecture includes a graphical schema visualization tool 240. The front-end application interface 210 communicates with the front-end application platform 250, while the data collection interface 230 communicates with the data sources 260. The front-end application platform 250 represents one or more application platforms running on client devices, for example, client device 150 or 160, or both. The data sources 260 represents one or more data sources from which the API architecture 200 collects data of different data types for reporting to the front-end application platform, for example, data source 114 or 115, or both.

The front-end application interface 210 and the data collection interface 230 also interact with data dictionary 220, which stores schema definitions that map actual data types, corresponding to data stored in the data sources 260, to logical schema exposed to the front-end application platform 250. Using the logical data model provided by the schema definitions allows the API architecture to be data agnostic, being able to connect to any available data source. In some implementations, the data dictionary 220 is a database memory that is included in the server 102. In some implementations, the data dictionary 220 is an external database that is communicably coupled to the server 102, for example, data dictionary 120.

The functional components of the API architecture 200 forming the front-end application interface 210 include a router 212, a report manager 216 and a query generator 214. The router 212 receives data requests from, and sends data reports to, the front-end application platform 250, routing all incoming connections to respective back-end processes. The request manager 216 manages the lifecycle of an incoming request; it processes data streams for the front-end, and interfaces with the data collection interface 230 to retrieve streaming/batch data based on requests.

In some implementations, the data requests include information corresponding to logical schema as request objects; the query generator 214 translates the requests into actual data types given a request object by the router 212. The query generator 214 performs the translation by looking up the schema definitions stored in the data dictionary 220. The translated request is sent to the request manager 216. The translation performed by the query generator 214 frees up end users from writing hard-coded queries and constantly updating them to adhere to the service design. In some implementations, the request objects include one or more keywords entered by the front-end user. In such implementations, the query generator 214 determines the logical schema based on the one or more keywords; and identifies the corresponding data type (if available) by looking up the schema definitions in the data dictionary 220. In some cases, the requests include GraphQL (GQL) requests. In such cases, the query generator 214 is a GQL Query generator, which translates/report and/gql requests into corresponding GraphQL-compliant requests for end users, given a request object by the router 212.

The data dictionary 220 stores schema definitions that the logical data model as well as data sources corresponding to the data model. This allows for a generic implementation that can connect to any available data source (for example, SQL, Kafka, MongoDB, Pulsar, among others), irrespective of the data type.

The data collection interface 230 includes a query resolver 232, a dispatcher 234, a schema generator 236, and a real-time (RT) event bus 238. The query resolver 232 receives the final (for example, translated) request from the request manager 216, and further translates the request into a database-specific query execution pipeline, accounting for parallelization. In some cases, in addition to querying for the requested data, the query resolver 232 also performs queries for related data belonging to other data sources, similar to the "join" capabilities offered by relational databases.

The dispatcher 234 receives the database-specific query from the query resolver 232, and breaks down the query into several lightweight, event-driven threads. The dispatcher 234 uses the threads to interface with the data sources 260 to service the front-end request corresponding to the database-specific query.

The event bus 238 allows front-end application platforms to subscribe to real-time data updates. This can be the case, for example, when the dispatcher 234 receives a query with a subscription request from the query resolver 232. In such cases, the dispatcher 234 sends a subscribe command to the event bus 238, which accordingly subscribes to the corresponding streaming data source.

When the front-end request includes a new data type, the schema generator 236 obtains the existing schemas definition from the data dictionary, generates a new schema definition mapping a new logical schema to the new data type, and provides the updated schema definitions to the front-end application interface 210. The updated schema definitions are also stored in the data dictionary.

In some implementations, the visualization tool 240 provides a graphical interface for front-end users to view the schema definitions stored in the data dictionary 220. In some cases, the visualization tool 240 provides options to the users to add, edit, or remove schema definitions from the data dictionary.

Some of the message exchanges between the functional components of the API architecture 200 are synchronous exchanges, as illustrated in FIG. 2 using solid lines to represent these message exchanges. Other message exchanges between the functional components of the API architecture 200 are asynchronous exchanges, as illustrated in FIG. 2 using dashed lines to represent these message exchanges.

Figure 3:
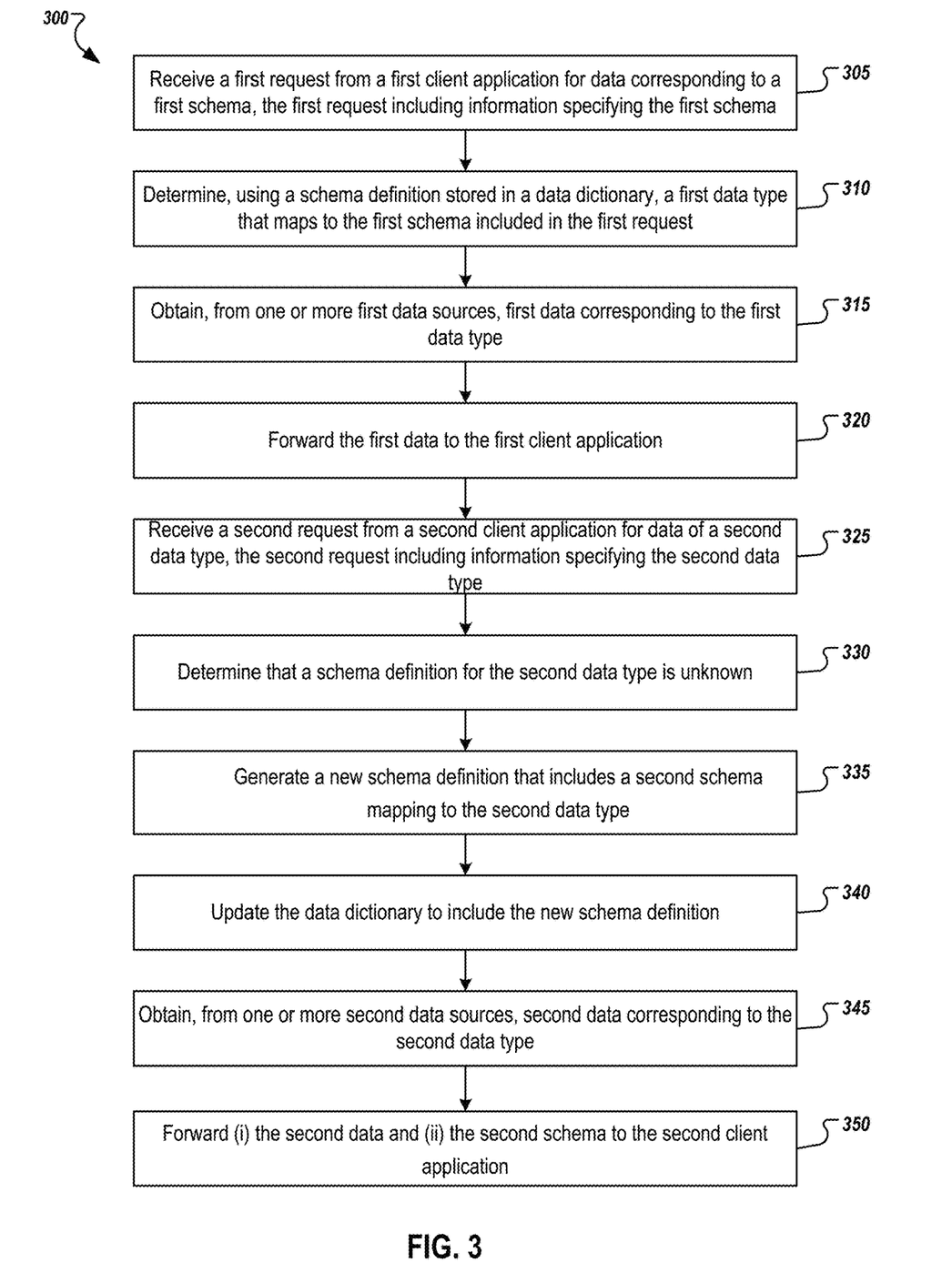
FIG. 3 is a flow chart diagram of an example method for collecting and reporting data for applications in one example implementation.

FIG. 3 is a flow chart diagram of an example method 300 for collecting and reporting data for applications in one example implementation. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate. In some instances, method 300 can be performed by the server 102 running the API architecture, described in FIG. 1, as well as other components or functionality described in other portions of this description, for example, functional components of the API architecture described in FIG. 2. Accordingly, in the following description, the method 300 being performed by the API architecture on the server 102 refers to the method performed by the functional components of the API architecture that are run on the server 102 by the processor 106 executing instructions stored in the memory 110 to implement the API architecture processes.

Method 300 starts by receiving a first request from a first client application for data corresponding to a first schema, the first request including information specifying the first schema (305). For example, in some implementations, the API architecture running on the server 102 determines reception of a request for data through the network interface 104, from a front-end application running on one of the client devices 150 or 160. The request includes a logical schema identifying the data requested.

Method 300 continues by determining, using a schema stored in a data dictionary, a first data type that maps to the first schema included in the first request (310). For example, in some implementations, the API architecture determines that the data request includes a logical schema, and accordingly accesses the data dictionary with the schema definitions from the dictionary database 120. The API architecture identifies a schema definition corresponding to the logical schema in the request, and determines the actual data type that corresponds to the logical schema.

Method 300 continues by obtaining, from one or more first data sources, first data corresponding to the first data type (315). For example, in some implementations, upon determining the actual data type that corresponds to the first request, the API architecture contacts one or more data sources, such as one or more of data sources 114 or 115, that store the requested data, and obtains the data from these sources.

Method 300 continues by forwarding the first data to the first client application (320). For example, in some implementations, the API architecture reports the data of the first type corresponding to the first schema that is collected from the data sources, to the front-end application running on one of the client devices 150 or 160, that sent the request.

Method 300 continues by receiving a second request from a second client application for data of a second data type, the second request including information specifying the second data type (325). For example, in some implementations, the API architecture determines reception of a second request for data through the network interface 104, from a front-end application running on one of the client devices 150 or 160. The request identifies the actual data type for the data requested.

Method 300 continues by determining that a schema definition corresponding to the second data type is unknown (330). For example, in some implementations, the API architecture determines that the data dictionary with the schema definitions stored in dictionary database 120 does not include a schema definition that maps the second data type in the second request to a logical schema. Accordingly, the API architecture infers that the second data type in the second request is a new data type that has not been previously handled in the API architecture.

Method 300 continues by generating a new schema definition that includes a second schema mapping to the second data type (335). For example, in some implementations, the API architecture dynamically generates a new schema definition with a new logical schema that maps to the second data type.

Method 300 continues by updating the data dictionary to include the new schema definition (340). For example, in some implementations, the API architecture updates the data dictionary stored in the dictionary database 120 to include the new schema definition.

Method 300 continues by obtaining, from one or more second data sources, second data corresponding to the second data type (345). For example, in some implementations, the API architecture contacts one or more data sources, such as one or more of data sources 114 or 115, and queries which of the data sources store data corresponding to the second data type. Upon identifying a data source that stores the requested data of the second data type, the API architecture obtains the data from the identified data source.

Method 300 continues by forwarding, to the second client application, (i) the second data and (ii) the second schema (350). For example, in some implementations, the API architecture reports the data of the second type that is collected from the identified data source, to the front-end application running on one of the client devices 150 or 160, that sent the request. Along with the data, the API architecture sends the new logical schema that is generated for the second data type. Subsequent requests from the front-end applications can include the new logical schema, instead of specifying the second data type.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure.

Other changes, substitutions, and alterations are also possible without departing from the spirit and scope of this disclosure.

What is claimed is:

1. A method for collecting and reporting data, the method comprising:
    receiving, by a server, a first request from a first client application for data corresponding to a first schema, the first request including information specifying the first schema;
    in response to receiving the first request, processing, by the server, the first request, wherein processing the first request comprises:
        determining, by the server using a schema definition stored in a data dictionary in the server, a first data type that maps to the first schema included in the first request;
        obtaining, by the server from one or more first data sources, first data corresponding to the first data type, the first data being distinct from the first schema;
        forwarding, by the server to the first client application, the first data;
    receiving, by the server, a second request from a second client application for data of a second data type, the second request including information specifying the second data type;
    in response to receiving the second request, processing, by the server, the second request, wherein processing the second request comprises:
        determining, by the server, that the second data type does not correspond to any schema known to the server;
        in response to determining that the second data type does not correspond to any schema known to the server, generating, by the server, a new second schema for the second data type and a new schema definition including the second schema, and updating the data dictionary to include the new schema definition, wherein the second schema was not previously known to the server;
        obtaining, by the server from one or more second data sources, second data corresponding to the second data type, the second data being distinct from the second schema; and
        forwarding, by the server to the second client application, (i) the second data along with (ii) the second schema that is distinct from the second data.

2. The method of claim 1, wherein obtaining the first data corresponding to the first data type further comprises:
    determining a third data type that is associated with the first data;
    obtaining, from one or more third data sources, third data corresponding to the third data type; and
    forwarding, to the first client application, the third data in conjunction with the first data in response to the first request.

3. The method of claim 2, wherein forwarding the third data in conjunction with the first data in response to the first request comprises:
    processing at least one of the first data or the third data to enable display, by the first client application, of the first data and the third data together.

4. The method of claim 1, wherein obtaining the first data from the one or more first data sources and obtaining the second data from the one or more second data sources comprises:
    obtaining the first data from one or more first databases that are configured to store data of the first data type; and
    obtaining the second data from one or more second databases that are configured to store data of the second data type, wherein the second data type is different from the first data type.

5. The method of claim 1, wherein the second request is received while obtaining the first data from the one or more first data sources, the method comprising:
    processing the second request while waiting to receive the first data from the one or more first data sources.

6. The method of claim 1, wherein the first data type comprises real-time streaming data, and wherein obtaining the first data from the one or more first data sources comprises:
    in response to receiving the first request, subscribing to the one or more first data sources; and
    upon the subscribing, receiving, from the one or more first data sources, real-time streaming data as the first data.

7. The method of claim 1, wherein the first data type comprises batch data, and wherein obtaining the first data from the one or more first data sources comprises:
    in response to receiving the first request, subscribing to the one or more first data sources; and
    upon the subscribing, fetching, from the one or more first data sources, preconfigured batch data as the first data using chunked data transfer.

8. The method of claim 1, wherein receiving the first request from the first client application for data comprises:
    receiving, from the first client application, one or more keywords entered by a user of the first client application; and
    generating, using a query generator, the first request from the one or more keywords.

9. The method of claim 1, further comprising:
    receiving a third request to access the data dictionary; and
    in response to the third request, enabling access to the data dictionary using a graphical schema visualization tool.

10. The method of claim 1, wherein forwarding at least one of the first data or the second data comprises forwarding bi-temporal data.

11. A system for collecting and reporting data, the system comprising:
    one or more processors;
    a data dictionary storing information comprising one or more schema definitions mapping of one or more logical data schema to one or more data types; and
    memory storing instructions that, when executed, cause the one or more processors to perform operations comprising:
        receiving, by a server, a first request from a first client application for data corresponding to a first schema, the first request including information specifying the first schema;
        in response to receiving the first request, processing, by the server, the first request, wherein processing the first request comprises:
            determining, by the server using a schema definition stored in the data dictionary, a first data type that maps to the first schema included in the first request;
            obtaining, by the server from one or more first data sources, first data corresponding to the first data type, the first data being distinct from the first schema;

forwarding, by the server to the first client application, the first data;

receiving, by the server, a second request from a second client application for data of a second data type, the second request including information specifying the second data type;

in response to receiving the second request, processing, by the server, the second request, wherein processing the second request comprises:

determining, by the server, that the second data type does not correspond to any schema known in the data dictionary;

determining that the second data type does not correspond to any schema known to the server, generating, by the server, a new second schema for the second data type and a new schema definition including the second schema, and updating the data dictionary to include the new schema definition, wherein new second schema was not previously known to the server;

obtaining, by the server from one or more second data sources, second data corresponding to the second data type, the second data being distinct from the second schema; and forwarding, by the server to the second client application, (i) the second data along with (ii) the second schema that is distinct from the second data.

12. The system of claim 11, wherein obtaining the first data corresponding to the first data type further comprises:
determining a third data type that is associated with the first data;
obtaining, from one or more third data sources, third data corresponding to the third data type; and
forwarding, to the first client application, the third data in conjunction with the first data in response to the first request, wherein at least one of the first data or the third data is processed to enable display, by the first client application, of the first data and the third data together.

13. The system of claim 11, wherein obtaining the first data from the one or more first data sources and obtaining the second data from the one or more second data sources comprises:
obtaining the first data from one or more first databases that are configured to store data of the first data type; and
obtaining the second data from one or more second databases that are configured to store data of the second data type, wherein the second data type is different from the first data type.

14. The system of claim 11, wherein the second request is received while obtaining the first data from the one or more first data sources, and wherein the operations comprise:
processing the second request while waiting to receive the first data from the one or more first data sources.

15. The system of claim 11, wherein the first data type comprises real-time streaming data, and wherein obtaining the first data from the one or more first data sources comprises:
in response to receiving the first request, subscribing to the one or more first data sources; and
upon the subscribing, receiving, from the one or more first data sources, real-time streaming data as the first data.

16. The system of claim 11, wherein the first data type comprises batch data, and wherein obtaining the first data from the one or more first data sources comprises:

in response to receiving the first request, subscribing to the one or more first data sources; and
upon the subscribing, fetching, from the one or more first data sources, preconfigured batch data as the first data using chunked data transfer.

17. The system of claim 11, wherein receiving the first request from the first client application for data comprises:
receiving, from the first client application, one or more keywords entered by a user of the first client application; and
generating, using a query generator, the first request from the one or more keywords.

18. The system of claim 11, wherein the operations further comprise: receiving a third request to access the data dictionary; and
in response to the third request, enabling access to the data dictionary using a graphical schema visualization tool.

19. The system of claim 11, wherein forwarding at least one of the first data or the second data comprises forwarding bi-temporal data.

20. Non-transitory computer-readable media storing instructions that, when executed, are configured to cause one or more processors to perform operations comprising:
receiving, by a server, a first request from a first client application for data corresponding to a first schema, the first request including information specifying the first schema;
in response to receiving the first request, processing, by the server, the first request, wherein processing the first request comprises:
determining, by the server using a schema definition stored in a data dictionary in the server, a first data type that maps to the first schema included in the first request;
obtaining, by the server from one or more first data sources, first data corresponding to the first data type, the first data being distinct from the first schema;
forwarding, by the server to the first client application, the first data;
receiving, by the server, a second request from a second client application for data of a second data type, the second request including information specifying the second data type;
in response to receiving the second request, processing, by the server, the second request, wherein processing the second request comprises:
determining, by the server, that the second data type does not correspond to any schema known to the server;
in response to determining that the second data type does not correspond to any schema known to the server, generating, by the server, a new second schema for the second data type and a new schema definition including the second schema, and updating the data dictionary to include the new schema definition, wherein the second schema was not previously known to the server;
obtaining, by the server from one or more second data sources, second data corresponding to the second data type, the second data being distinct from the second schema; and
forwarding, by the server to the second client application, (i) the second data along with (ii) the second schema that is distinct from the second data.

* * * * *